US008909705B2

(12) United States Patent
Douillet et al.

(10) Patent No.: US 8,909,705 B2
(45) Date of Patent: Dec. 9, 2014

(54) METHOD AND SYSTEM FOR USE IN PROVIDING NETWORK SERVICES INTERCHANGE

(75) Inventors: Ludovic Douillet, Escondido, CA (US); Bryan Mihalov, Escondido, CA (US); Aran Sadja, San Diego, CA (US)

(73) Assignee: Sony Corporation, Tokyo (JP)

(*) Notice: Subject to any disclaimer, the term of this patent is extended or adjusted under 35 U.S.C. 154(b) by 721 days.

(21) Appl. No.: 13/183,238

(22) Filed: Jul. 14, 2011

(65) Prior Publication Data
US 2013/0018948 A1    Jan. 17, 2013

(51) Int. Cl.
*G06F 15/16* (2006.01)
*G06F 9/54* (2006.01)

(52) U.S. Cl.
CPC .................................. *G06F 9/541* (2013.01)
USPC ........................................................ 709/204

(58) Field of Classification Search
USPC ........................................................ 709/204
See application file for complete search history.

(56) References Cited

U.S. PATENT DOCUMENTS

| | | | |
|---|---|---|---|
| 6,944,665 B2 | 9/2005 | Brown et al. | |
| 7,693,953 B2 | 4/2010 | Middleton et al. | |
| 8,352,545 B2 | 1/2013 | Takakura et al. | |
| 2005/0216572 A1* | 9/2005 | Tso et al. | 709/218 |
| 2007/0280206 A1 | 12/2007 | Messer et al. | |
| 2013/0275510 A1* | 10/2013 | Middleton et al. | 709/204 |

FOREIGN PATENT DOCUMENTS

| | | |
|---|---|---|
| GB | 2434721 | 8/2007 |
| JP | 2002-366857 | 12/2002 |
| JP | 2007080167 | 3/2007 |
| JP | 2010-128713 | 6/2010 |
| JP | 2010128713 | 6/2010 |
| JP | 2010-224700 | 10/2010 |
| JP | 2010224700 | 10/2010 |
| KR | 1020070115595 | 12/2007 |
| KR | 1020090106608 | 10/2009 |
| KR | 10-2011-0055526 | 5/2011 |
| WO | WO-2010014544 | 2/2010 |
| WO | 2010/014544 | 4/2010 |

OTHER PUBLICATIONS

KIPO; Notice of Preliminary Rejection issued in Korean Patent Application No. 10-2012-0071634; Mailed Aug. 9, 2013; 13 Pages.
JPO; Official Action issued in Japanese Patent Application No. 2012-160950; Mailed Aug. 7, 2013; 6 Pages.

(Continued)

*Primary Examiner* — Jason Recek
(74) *Attorney, Agent, or Firm* — Fitch, Even, Tabin & Flannery LLP

(57) ABSTRACT

Systems and methods are provided in establishing interchanges between consumer electronic (CE) devices and networking services. Some of these embodiments establish an intermediate application programming interface (API) between a plurality of remote CE devices and one or more social networking APIs each corresponding to a social networking service; translate, through an interchange service, communications between the intermediate API and the one or more social networking APIs; identify modifications to a first social networking API; implement a first update to the interchange service such that translations provided by the updated interchange service between the intermediate API and the first social networking API are consistent with the modifications to the first social networking API; and avoid updating at each of the plurality of CE devices relative to the modifications to the first social networking API.

18 Claims, 7 Drawing Sheets

(56) References Cited

OTHER PUBLICATIONS

JPO; Final Office Action issued in Japanese Patent Application No. 2012-160950; Mailed Apr. 23, 2014; 5 Pages.

Nikkei Electronics; "Home Appliance Shinsei, Mastering Unknown Data Mine"; Japan; Nikkei BP Press; Jun. 27, 2011; vol. 1059; pp. 55-61 (Partial English translation included).

Katoh; "Toward the Realization of Hybridcast"; NHK Tech Laboratory R & D; Japan; Housou Kyoukai; Sep. 15, 2010; No. 123; pp. 56-63 (English abstract included).

Notice of Preliminary Rejection for Korean Patent Application No. 10-2012-71634 mailed from the Korean Intellectual Property Office on Aug. 9, 2013.

Official Action for Japanese Patent Application No. 2012-160950 mailed from the Japan Patent Office on Aug. 7, 2013.

* cited by examiner

METHOD AND SYSTEM FOR USE IN PROVIDING NETWORK SERVICES INTERCHANGE

BACKGROUND

1. Field of the Invention

The present invention relates generally to network services, and more specifically to utilizing services though consumer electronic devices.

2. Discussion of the Related Art

Consumer electronic (CE) devices are readily available. Many manufacturers distribute their CE devices throughout the world. Some of these CE devices have the capabilities to connect with other devices or services over networks, such as the Internet. Accordingly, these CE devices provide users with additional functionality and/or the ability to access additional content and/or services.

SUMMARY OF THE INVENTION

Several embodiments of the invention provide systems, apparatuses and methods of establishing interfaces or interchanges between consumer electronic (CE) devices and networking services accessible over the Internet. Some of these embodiments provide methods that establish an intermediate application programming interface (API) between a plurality of remote consumer electronic (CE) devices and one or more social networking APIs, where each of the one or more social networking APIs correspond to a social networking service; translate, through an interchange service, communications between the intermediate API and the one or more social networking APIs; identify modifications to a first social networking API of the one or more social networking APIs; implement a first update to the interchange service such that translations provided by the updated interchange service between the intermediate API and the first social networking API are consistent with the modifications to the first social networking API; and avoid updating at each of the plurality of CE devices relative to the modifications to the first social networking API while still allowing each of the plurality of CE devices to access and communicate according to the modified first social networking API through the translation between the intermediate API and the modified first social networking API.

Further embodiments provide computer program products comprising a medium for embodying a computer program for input to a processor based system and a computer program embodied in the medium for causing the processor based system to perform steps comprising: establishing an intermediate application programming interface (API) between a plurality of remote consumer electronic (CE) devices and one or more social networking APIs, where each of the one or more social networking APIs correspond to a social networking service; translating, through an interchange service, communications between the intermediate API and the one or more social networking APIs; identifying modifications to a first social networking API of the one or more social networking APIs; implementing a first update to the interchange service such that translations provided by the updated interchange service between the intermediate API and the first social networking API are consistent with the modifications to the first social networking API; and avoiding updating at each of the plurality of CE devices relative to the modifications to the first social networking API while still allowing each of the plurality of CE devices to access and communicate according to the modified first social networking API through the translation between the intermediate API and the modified first social networking API.

Additionally, some embodiments provide systems for use in providing access to network services. Some of these system comprise: means for establishing an intermediate application programming interface (API) between a plurality of remote consumer electronic (CE) devices and one or more social networking APIs, where each of the one or more social networking APIs correspond to a social networking service; means for translating, through an interchange service, communications between the intermediate API and the one or more social networking APIs; means for identifying modifications to a first social networking API of the one or more social networking APIs; and means for implementing a first update to the interchange service such that translations provided by the updated interchange service between the intermediate API and the first social networking API are consistent with the modifications to the first social networking API and avoiding updating at each of the plurality of CE devices relative to the modifications to the first social networking API while still allowing each of the plurality of CE devices to access and communicate according to the modified first social networking API through the translation between the intermediate API and the modified first social networking API.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
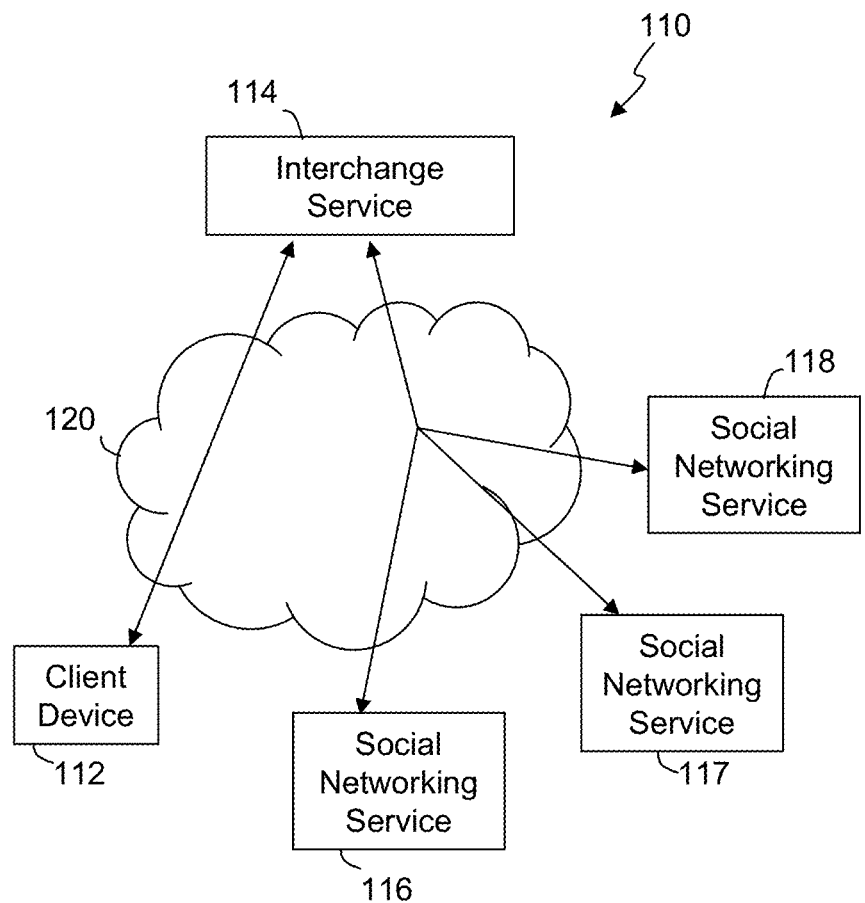
FIG. 1 depicts a simplified block diagram of a system according to some embodiments that allows consumer electronic (CE) devices to effectively communicate with one or more network services through an interchange service.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations," or similar language means that a particular feature, structure, or characteristic described in connection with the embodiment is included in at least one embodiment of the present invention. Thus, appearances of the phrases "in some embodiment," "in some implementations," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Communication between consumer electronic (CE) devices and social networking services or other services accessible over the Internet often employ a networking service API that allows the CE device to accurately issue communications and/or commands to the social networking service, and in some instances allows the CE device to accurately receive communications and/or implement commands received from the social networking service. These social networking service APIs define at least in part parameters, commands, structures of communications, and the like in configuring communications so that they are accurately received and can be acted upon.

Typically, when updates or modifications are implemented to a social networking API as activated by a corresponding social networking service, modifications are also implemented at the CE devices in order to allow the CE devices to continue to accurately communicate with the social networking service using the modified social networking API. These modifications to CE devices can be delayed while waiting for modification or updates to be distributed to CE devices, for example, from CE device manufacturers. Similarly, these modifications or updates can be difficult for some CE device manufacturers and/or distributor to implement and distribute because of potentially numerous different types of CE devices and/or the vast numbers of CE devices in use.

Some embodiments provide methods and systems that establish an interface or interchange between CE devices and social networking services or other networking services. The interchange provides a translation between an intermediate API, utilized between a CE device and an interchange service, and the social networking API, utilized between the interchange service and the social networking service. By establishing the interchange service and the intermediate API, when modifications to a social networking API and a corresponding social networking service are implemented by a social networking service, modifications at the interchange service can be implemented and thus avoid having to generate modifications to multiple different types of CE devices and push out those modifications to hundreds of thousands to millions of CE devices. It is noted that the below description references social networking services and social networking APIs; however, the present invention is not limited to social networking services and social networking API, and instead can applied to substantially any service accessible over a network, such as the Internet, and any relevant corresponding API.

FIG. 1 depicts a simplified block diagram of a system 110 according to some embodiments that allows CE devices 112 to effectively communicate with one or more social networking services 116-118 through an interchange service 114. The interchange service 114 bridges and/or provides a translation of communications between the CE device 112 and the social networking services 116. Communications between the CE device 112 and the interchange service 114 are configured according to an intermediate API established between the CE device 112 and the interchange service 114. A social networking API is established between the interchange service 114 and a social networking service (e.g., social networking service 116), where the social networking API is different than the intermediate API. Typically, different social networking APIs are established between the interchange service 114 and each different social networking service 116-118. Accordingly, the interchange service 114 in some implementations provides an intermediary between the CE device 112 and a plurality of different social networking services 116-118. Further, the interchange service and intermediate API, in some embodiments, insulate the CE device 112 from modifications to the social networking APIs and/or at the social networking service 116-118, and additionally avoids having to implement modifications at each of numerous CE devices 112 as a result of modifications to the social networking APIs. Instead, modifications can be implemented at the interchange service 114 such that the interchange service provides the accurate translation between the APIs while allowing the CE devices to continue to use the intermediate API. As such, the CE devices can be unaware of modifications to a social networking API while continuing to operate and provide users with effective interaction with the social networking service.

In some embodiments, the interchange service 114 receives communications from the CE device 112 configured according to an intermediate API established between the CE device 112 and the interchange service 114. In response to receiving the communication the interchange service 114 identifies an intended social networking service (e.g., social networking service 116). The interchange service 114 performs a translation of the communication and/or relevant portions of the communication to be consistent with the social networking API established between the interchange service 114 and the intended social networking service 116, and forwards the translated commands, information or the like to the social networking service 116 configured according to the social networking API. Similar translations can be performed by the interchange service 114 in directing communications from the social networking service 116 to the CE device 112.

Figure 2:
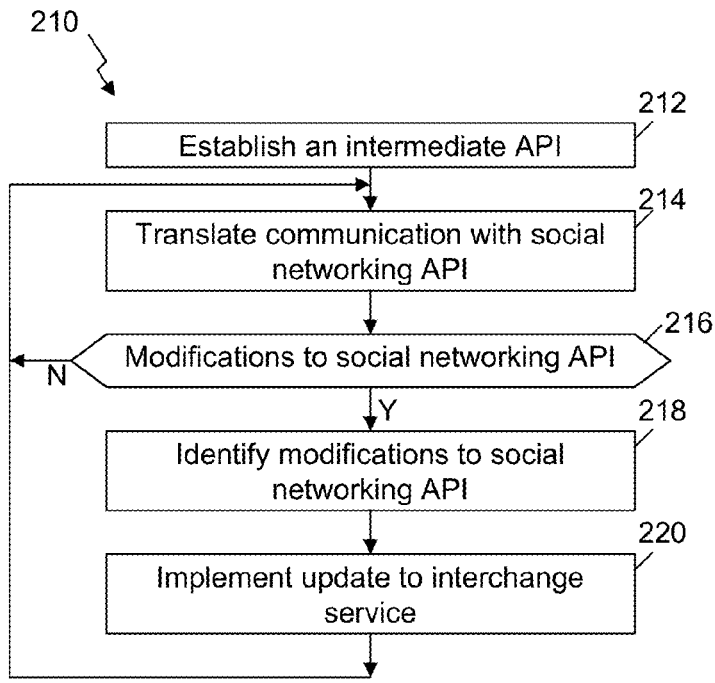
FIG. 2 depicts a simplified flow diagram of a process of providing CE devices with access to social networking services according to some embodiments.

FIG. 2 depicts a simplified flow diagram of a process 210 of providing CE devices 112 with access to social networking services 116-118 according to some embodiments. In step 212, an intermediate API is established between a plurality of remote CE devices 112 and the interchange service 114. Similarly, one or more social networking APIs are established between the interchange service 114 and the corresponding one or more remote social networking services 116-118, where each of the one or more social networking APIs typically corresponds to a different social networking service. In step 214, the interchange service 114 provides a translation of communications between the intermediate API and the one or more social networking APIs. This translation can include translations of communications from a CE device 112 and configured according to the intermediate API to a social networking API to be communicated to an intended social networking service 116 associated with the social networking API. Similarly, the interchange service can receive communications from the social networking service 116 configured according to the social networking API and translate the communication to the intermediate API and direct the translated communications to the intended CE device 112.

In step 216, it is determined whether one or more modifications to a social networking API are detected and/or are to be implemented. For example, in some instances, the social networking service 116 notifies the interchange service 114 and/or a source or service implementing the interchange service 114 that modifications to the social networking API are going to be implemented and what those modifications are going to include. These modifications can include changes in command codes, command parameters, structure or format of a communication, or the like, or even a complete replacement of the social networking API. As another example, a new social networking service may be identified such that the interchange service 114 is to be configured to provide effective translation between the intermediate API and the new social networking API associated with the new social networking service. When modifications are not to be implemented the process 210 returns to step 214 to continue providing the translations between the intermediate API and the one or more social networking APIs.

Alternatively, when it is determined that modifications are to be implemented the process 210 continues to step 218 to identify the social networking API and the one or more modifications to the social networking API to be implemented, or identify a new social networking API. In step 220, an update is implemented at the interchange service 114 updating the interchange service. The process 210 can then return to step 214 to continue to provide translations such that the translations provided by the updated interchange service 114 between the intermediate API and the modified social networking API are consistent with the modifications to the social networking API. Similarly, modifications are typically not needed to the intermediate API at least because the interchange service 114 continues to provide the translation allowing the intermediate API to continue to operate and avoids having to modify the intermediate API. The modifications are, in some embodiments, often implemented as updated or changed coding to the interchange service 114 and/or modified libraries, look-up tables and/or databases that associate intermediate API commands, calls, instructions, structure, and the like with modified commands, calls, instructions, structure and the like of the modified social networking API.

Further, the modification at the interchange service avoids having to perform or push updates to each of the plurality of CE devices, which typically would be needed without the interchange service 114 in order for the CE devices 112 to continue to effectively communicate with the social networking service. The modifications at the interchange service 114 continue to provide the accurate translation consistent with the modified social networking API, and accordingly continues to allow the plurality of CE devices 112 to access and communicate according to the modified social networking API through the translation between the intermediate API and the modified social networking API. Further, significant time, resources and costs can be dramatically reduced by implementing modifications to the interchange service 114 to provide accurate translations between the intermediate API and the social networking API. Still further, the implementation of modifications to the interchange service 114 typically can be implemented quicker than pushing modifications out to the numerous CE devices 112, which greatly improves users' experiences.

In some implementations, communications with the social networking service 116-118 provides the interchange service and/or a source operating the interchange service information about the modifications being made to a social networking API, as well as scheduling and timelines for implementing modifications or updates to the social networking API. Accordingly, the modifications at the interchange service 114 to compensate for the modifications with the social networking API can similarly be implemented according to the schedule. The interchange service, in some instances, can maintain libraries, look-up tables, databases, etc. for the one or more social networking services. Some modifications include the modification of these libraries and/or look-up tables. The interchange service, once modified, can be tested for accurate operation, and then deployed to be accessible to the CE devices, such as through the Internet.

As described above, in some embodiments the modifications to the interchange service 114 may include the incorporation of an additional social networking API corresponding to a social networking service that was previously unsupported through the interchange service. Similarly, the modification may include no longer providing an interchange with a social networking service and corresponding social networking API that was previously supported.

Figure 3:
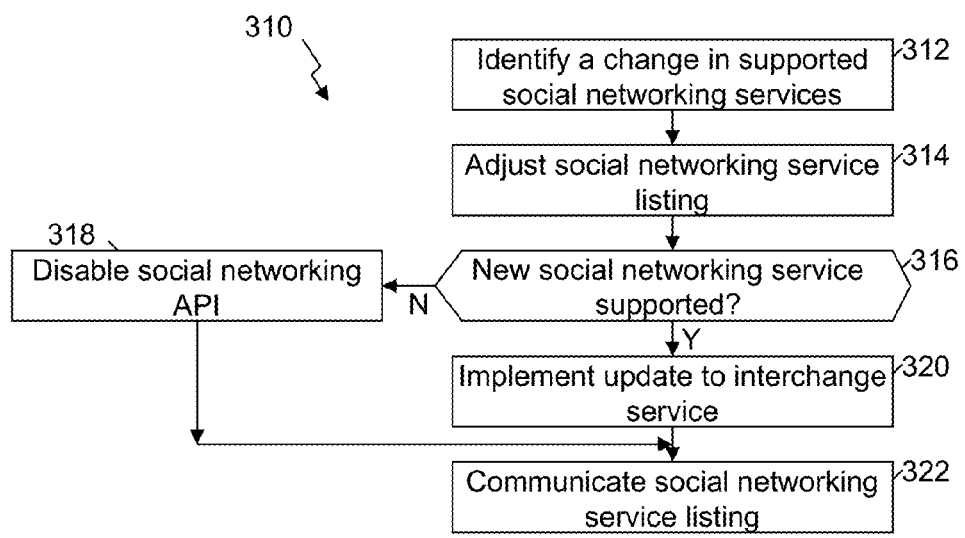
FIG. 3 depicts a simplified flow diagram of a process according to some embodiments of identifying modifications to the social networking services supported though the interchange service.

FIG. 3 depicts a simplified flow diagram of a process 310 according to some embodiments of identifying modifications to the social networking services 116-118 supported though the interchange service 114. In step 312, it is identified that there is a change in the social networking services that are supported through the interchange service 114. Typically, the interchange service 114 and/or a corresponding service providing, controlling or in communication with the interchange service 114 maintains a listing of the social networking services supported by the interchange service and with which users at CE devices 112 can interact with through the interchange service 114. The change may result from the service controlling the interchange service deciding to add a social networking service to be supported through the interchange service 114 that was previously unsupported. Similarly, the service may decide not to provide access through the service to a previously supported social networking service.

The process continues to step 314 in responds to detecting the change in the social networking services supported where the listing of social networking services is adjusted to reflect the change. In step 316, it is determined whether the change is the addition of a social networking service. When the change is not the addition of a social networking service the process 310 advances to step 318 where one or more social networking APIs corresponding to a no longer supported one or more social networking services are disabled. The process then continues to step 322.

Alternatively, step 320 is entered where an update is implemented to the interchange service 114 to support translations between the intermediate API and the additional social networking API associated with the added social networking service. The support of the additional social networking service typically is implemented by developers that generate and test the update to provide the translation (e.g., through code, libraries, look-up tables and/or databases).

In step 222, the social networking service listing is communicated to the one or more CE devices 112 to notify the users at the CE devices regarding which social networking services are supported and can be accessed through the service. In some instances, step 222 may be implemented such that the listing of supported social networking services is communicated in response to a request from the CE device 112. In other instances, the listing may be communicated to the CE devices based on a schedule (e.g., periodically, at designated times, or the like), or otherwise communicated to the CE devices. Additionally or alternatively, the list may be distributed in response to updates to the list.

Figure 4:
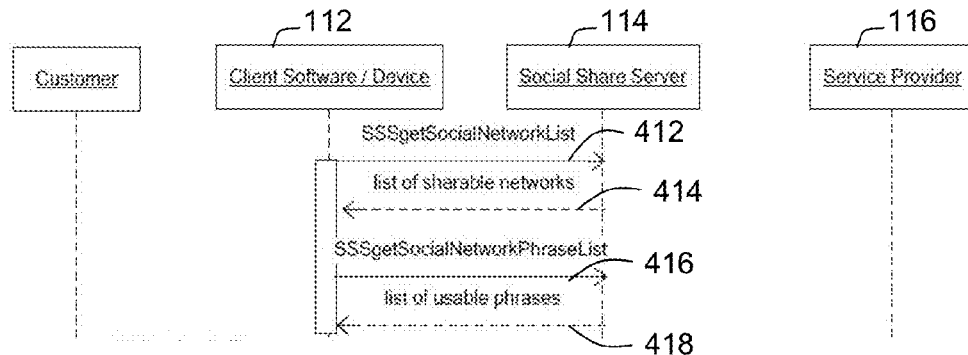
FIG. 4 depicts a simplified block diagram of a system showing the communications, according to some embodiments, between a CE device and the interchange service in distributing the listing of social networking services supported through the interchange service.

FIG. 4 depicts a simplified block diagram of a system 410 showing the communications, according to some embodiments, between a CE device 112 and the interchange service 114 in distributing the listing of social networking services supported through the interchange service 114. In some embodiments, the CE device 112 initiates a request 412 (e.g., getSocialNetworkList) to the interchange service 114 or other service in cooperation with the interchange service requesting the active list of social networking services available and accessible to the requesting CE device 112. In some instances, different CE devices may have access to different social networking services and/or levels of social networking services. Typically, this request 412 is issued and any returned listing is accessed at least once before attempting to access additional system services or resources, including access to one or more social networking services. Further, the request 412 can be issued periodically, at boot, based on a schedule, or the like. The request 412, in some instances, identifies one or more parameters relevant to the requesting CE device, such as one or more of information that identifies the CE device, information that identifies a social networking service, information that defines an address of the CE device (e.g., a wired or wireless media access control address), a type of CE device, a model name or type of the CE device, a current software or application and/or version being implemented to access the social networking services, a version of the intermediate API currently supported, response size or limit, offset timing of returned results, language of results, timing information and/or other such information.

A response 414 is received from the interchange service or other related service identifying which, if any, social networking services the CE device 112 can access. In some instances, a null or empty listing may be returned indicating that access to social networking services is unavailable for the CE device 112 and/or access to social networking services is temporarily disabled. The CE device 112 may similarly disable social networking features until a non-empty list is returned. Further, in some instances the CE device maintains a current or fresh listing of available social networking services based on responses 414. This can reduce the communications and network bandwidth usage. For example, the information and/or metadata returned in the response 414 may be cached at the CE device 112 and subsequently utilized. The reply may include information similar to those in the request along with the listing information, such as one or more of social networking service identifiers (which may be used in some instances with subsequent communications related to the corresponding social network services), listing information of the available social networking services, an order defining the listing order of the social networking services, description of the corresponding social networking services, graphics information (e.g., information for an icon or other graphics information that may be associated with one or more of the social networking services, such as dimensions, links, or the like), one or more internet links, one or more features available through the one or more social networking services, parameters associated with features, and/or other such information. The acquisition of the listing of available social networking services allows for the dynamic addition or removal of available social networking services without having to modify the CE devices. Additionally, the interchange service 114 does not provide access to social networking services removed from the listing and incorporates additional translation functionality for newly added social networking services.

In some embodiments, the CE device 112 communicates a request for confirmation and/or social networking service configuration information as a confirmation that the interchange service 114 is functioning and providing access to the social networking services. The interchange service 114 returns a confirmation, which may include configuration information for the available social networking features. With the knowledge of the available features the CE device 112 can issue subsequent communications and/or calls relevant to the features available. In some instances, an empty list or null data for the configuration information is returned to indicate that social networking features are disabled, typically temporarily disabled. The CE device may similarly disable social networking features until a non-empty list is returned.

Still referring to FIG. 4, some embodiments additionally allow a CE device 112 to request 416 a listing of predefined or predetermined phrases or commands (e.g., getSocialNetworkPhraseList). A reply 418 is returned from the interchange service 114 or related service in response to the request that includes one or more phrase listings for one or more supported social networking services 116-118. For example, some predetermined phrases may be available to update or alter a user's status at the social networking service 116, update or alter a particular feature of the social networking service, update or alter a status in relation to a particular piece of content, and/or other such modifications at the social networking service.

The phrase listing(s) can be particularly helpful with CE devices 112 with a limited input interface (e.g., non-keyboard remote control, etc.). In some instances, the phrase list provides a quick sample of generic phrases that can be issued to one or more social networking services. For example, prior to calling a status update command (e.g., postSocialNetworkStatus) the CE device 112 may present to a user a list of potential update phrases to choose from. Should the user select a phrase, a phrase identifier (phrase_id) can be identified in some instances and transmitted to the interchange service 114, which may also be accompanied by additional information, metadata and/or required information or metadata.

In some implementations, the request for the phrase listing can be initiated as part of or in cooperation with the request for the listing of supported social networking services. Further, the request for the phrase listing may be re-issued or re-requested, such as periodically, at intervals, based on a schedule or the like, which may be specified by cache control instructions. Additionally, the request for the phrase listing and/or reply may include parameters relevant to the requesting CE device and/or the one or more social networking services such as, but not limited to those described above with reference to the request for the listing of social networking services and/or the reply. Further, the reply can identify the one or more phrases, which can address actions, information, requests, commands, identifications and the like. For example, the reply may include information and/or text for the pre-defined phrases available for use, such as when updating a users status on a social networking service, keys or titles can be included that may be include or be replaced by the appropriate text such as but not limited to an {action} associated with an action type (e.g., "watching" associated with witching a movie or video, "listening to" associated with listening to audio content, and other such actions), {title} which can for example be associated with a title of the phrase, {provider} which can be associated with a service providing the interchange service 114, social networking service provider or the like, and/or other relevant parameters.

In those instances where the reply 418 returns an empty listing or no list is available, the CE device 112 can issue a subsequent request at a later time, such as when a user attempts to post their status. In some instances, if a phrase list is not available at the time a user attempts to issue a corresponding command (e.g., post a status) the CE device may not allow updates or may limit commands (e.g., limits updates to manually entered updates using a status parameter (e.g., a predefined status parameter). Further, in some instances the CE device maintains a current or fresh phrase listing, which again can reduce the communications and network bandwidth usage.

Figure 5:
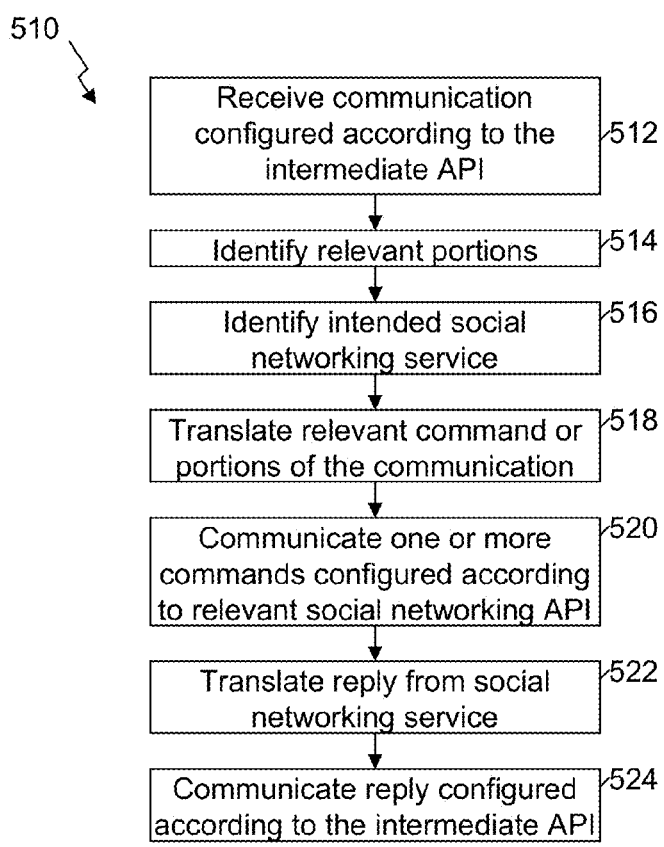
FIG. 5 depicts a simplified flow diagram of a process according to some embodiments of implementing a conversion or translation between the intermediate API and a social networking API associated with an intended social networking service.

FIG. 5 depicts a simplified flow diagram of a process 310 according to some embodiments of implementing a conversion or translation between the intermediate API and a social networking API associated with an intended social networking service 116. For example, in some communications from a CE device 112 the communication can include a command to be implemented at an intended social networking service (e.g., social networking service 116), where the communication and/or command are configured according to the intermediate API. The command can be substantially any relevant command associated with the intended social networking site, such as logging in to the social networking service 116, updating a status on the social networking service 116, posting something to the social networking service, removing something previously posted and/or displayed through the social networking service, accessing communications through the social networking service, communicating with other users through the social networking service and/or other relevant commands.

In step 512, a communication is received at the interchange service 114 from a CE device 112. Again, the communication is configured according to the intermediate API. In step 514, the interchange service 114 parses the communication, identifies and extracts relevant information, such as but not limited to an identifier of the CE device 112 sending the communication, identification of an intended social networking service (e.g., networkService_id), a command or command identification, description information, status information and/or other relevant information. Further, in some instances, the communication may include information specific to an intended social networking service, such as but not limited to credentials associated with the social networking service and/or other credentials, user identifier or identification information, authentication information, communication identification (e.g., the communication is in response to or associated with an early communication), expiration information (e.g., expiration information of credentials), and/or other relevant information.

In step 516, the interchange service 114 identifies the intended social networking service and the corresponding social networking API. This can be based on identification of the social networking service within the communication, prior communications, or the like. In step 518, the interchange service 114 performs a translation of the communication or the relevant portions of the communication from the intermediate API to the appropriate social networking API. In some instances, the interchange service 114 utilizes translation libraries, look-up tables and the like in performing the translation. For example, when the communication includes a command, a library may identify the command configured according to the intermediate API and further identify a corresponding command for the intended social networking API. It is noted that in some instances, a command from the CE device 112 may correspond to a single command or may correspond to a set of commands that includes two or more commands corresponding to the intended social networking service. For example, the interchange service 114 in response to receiving the communication from the CE device 112 can identify a library corresponding to a social networking API corresponding to a social networking service 116 intended to receive at least a portion of the communication from the CE device. The interchange service 114 further identifies within the library at least a first entry corresponding to the communication and/or command communicated by the CE device. In some instances, the interchange service may additionally identify within the library one or more additional entries associated with the first entry and comprising a command set corresponding to the social networking API.

In step 520, the interchange service communicates to the relevant social networking service that is configured according to the social networking API. As indicated above, in some instances a command configured according to the intermediate API may correspond to a set of commands according to the social networking API. Further, when there is a set of commands, all of the commands of the set may not be sent at the same time. In some instances, a first command may be communicated with other commands from the set being subsequently communicated, for example, in response to a reply communication from the social networking service based on a prior communication or command. As one example, a received communication configured according to the intermediate API that includes a request to initiate a login with an intended social networking service can correspond with a set of social networking API commands which can include a first command to initiate a login sequence, followed by one or more commands to provide relevant login information, such as user name and password. Accordingly, the translation at the interchange service 114 may result in a set of commands that are utilized and communicated by the interchange service, and often without further interaction with the CE device 112 or from the user. Similarly, a subsequent command from the set of commands may be dependent on what information or request is returned from the social networking service.

Still referring to FIG. 5, in those instances where a reply is received from the social networking service 116 that is to be forwarded back to the CE device 112 step 522 is entered where the interchange service 114 performs a translation of the relevant portions of the communication from the social networking service 116 and configured according to the social networking API to the intermediate API. Again, the translation to the intermediate API may correspond to a single communication or command, or to a set of communications and/or commands. In step 524, the interchange service 114 communicates the translated portions of the communication, and when relevant additional information incorporated by the interchange service 114, to the CE device 112.

Figure 6:
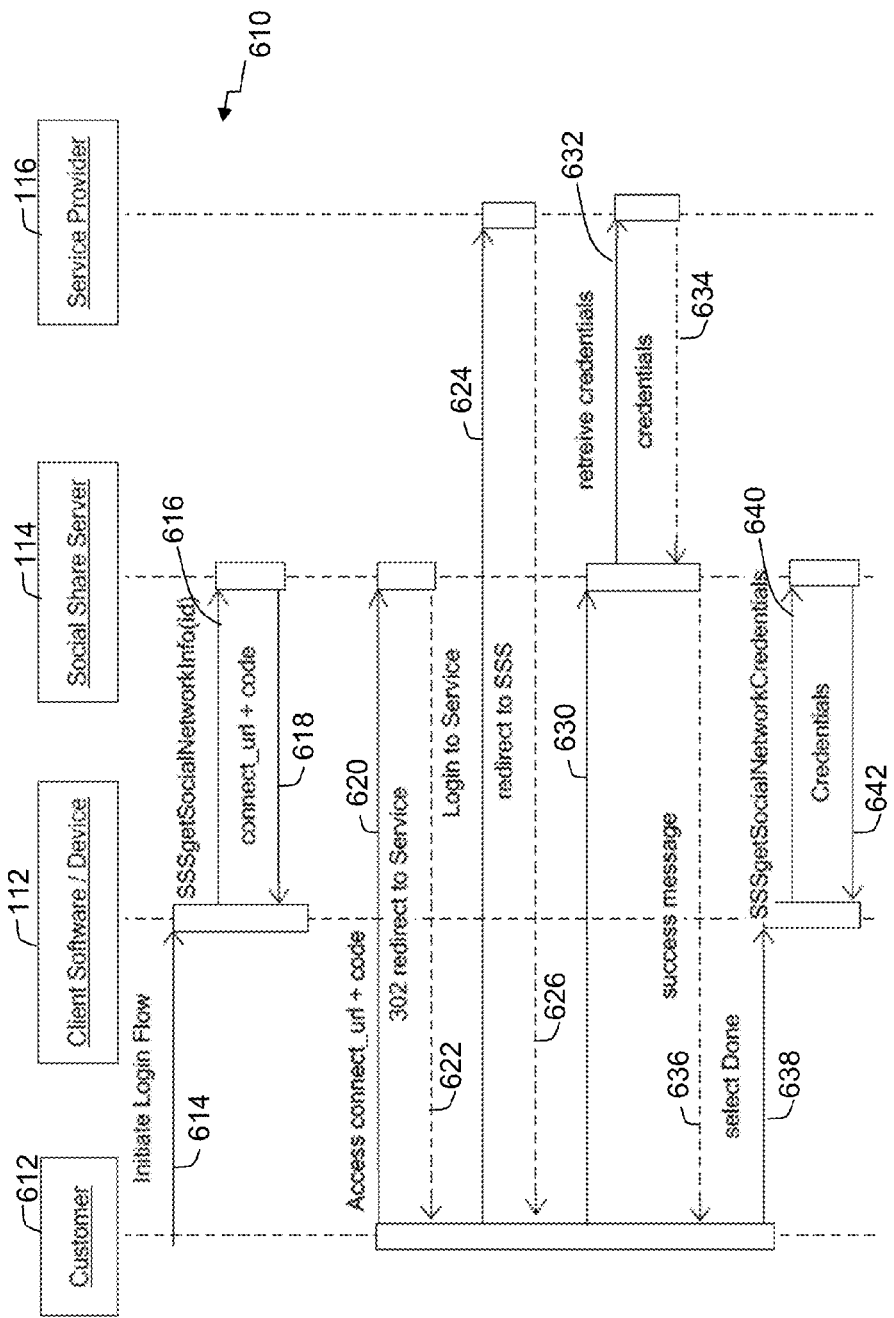
FIG. 6 depicts a simplified block diagram of a system showing the communications, according to some embodiments, between a CE device, the interchange service and a social networking service, as well as interactions of a user with the CE device.

FIG. 6 depicts a simplified block diagram of a system 610 showing the communications, according to some embodiments, between a CE device 112, the interchange service 114 and a social networking service 116, as well as interactions of a user 612 with the CE device 112. In this example, the system 610 shows the interactions in establishing a linking or user login with the social networking service 116 as implemented in some instances. Often, the user 612 initiates (step 614) a login by activating a login through the CE device 112. In some embodiments, when a prior linking has not been established with the identified social networking service and/or updated credentials may be needed (e.g., previous credentials are expired), the CE device 112 issues a request (step 616) to the interchange service 114 for additional information (e.g., getSocialNetworkInfo(id)) about the social networking service 116. Typically, the request identifies the CE device 112 and the social networking service 116 attempting to be accessed. Other information may be included, such as but not limited to user identification, one or more CE device identifiers (e.g., serial number, model number, model type, etc.), authentication information (e.g., secure socket layer (SSL) authentication, encryption authentication, signature, passcode(s), password(s), or other relevant authentication information), the information identified above relative to device type, model number, version numbers and the like, and other such information.

In reply to the request 616, the interchange service 114 identifies the CE device and the social networking service and returns additional information (step 618) to be used by the CE device 112 in logging-in to the social networking service 116. In some embodiments, the reply (step 616) includes linking information and/or instructions for the CE device 112 and/or user 612 to implement or follow. For example, the linking information can include an Internet address, link, Uniform Resource Identifier (URI), Uniform Resource Locator (URL) or the like. Other information may also be included such as one or more passcodes, pass phrases, passwords, authentication information, and/or other such information. In some instances the passcode can randomly be generated and/or be time limited. Additionally, in some instances, further instructions may be included (e.g., a URL (connect_url "www.example.com/social/">) and code (e.g., a alphanumeric code, such as sncode="abc123") can be defined, with instructions (e.g., "Login to Social Network Service_1 to share: Please go to {connect_url} and input the following link code {sncode} then log in to Social Network Service_1 using your existing account or create a new account."). Similarly, display parameters, graphics, text entry fields, text entry templates, icon information, displayable user options or buttons, and the like may also be included that define how information is displayed to the user 612 at the CE device 112. In some instances, when a CE device 112 has browser functionality the CE device may automatically begin a linking process using the provided information (e.g., connect_url, and sncode). With some social networking services the service does not allow direct login, but instead redirects the login to a site, which can introduce problems for the interchange service 114 in associating a login to a particular CE device 112 and/or associating communications from a social networking service 116 to a particular CE device. Accordingly, the passcode in some instances can be used to establish a login corresponding with the interchange service 114 while associating communicates with the social networking service with the particular CE device. The interchange service 114 can utilize a look-up to identify a CE device based on the passcode and/or identify one or more social networking services linked or accessible by the CE device.

With the information provided by the interchange service 114 the user 612 and/or CE device 112 can implement a login (step 620) using for example the URL, when relevant the passcode, and other instructions provided, which is directed to the interchange service 114 in accordance with the intermediate API. In response, the interchange service 114 redirects (step 622) the CE device request back through the CE device 112, and the user 612 completes the login (step 624) through the CE device 112 (e.g., providing user, password and/or other relevant information). The reply (step 626) from the social networking service 116 is redirected (step 230) by the CE device 112 to the interchange service 114. With this information the interchange service 114 can then complete the login by requesting (step 632) from the social networking service 116 relevant authorizations, credentials, access tokens and/or other relevant information. The social networking service 116 responds (step 634) with the relevant authorizations, credentials, access tokens and the like.

Once the credentials are received the interchange service 114 notifies (step 336) the CE device 112 and thus the user 612 of the successful login. The user confirms the login (step 638) with the CE device 112, which in turn notifies (step 640) the interchange service 114. The interchange service 114, in some instances, confirms the CE device, for example, using the passcode, and forwards the credentials and/or authorization to the CE device 112 for future use (step 642). The interchange service 114 can store credentials for each CE device (e.g., based on a CE device identification), and/or the CE devices 112 or some CE devices may be responsible for maintaining the credentials and passing the relevant credentials up as needed. Further, a single CE device 112 can be associated with multiple social networking services or other services, and correspondingly associated with multiple credentials. In some embodiments, the credentials are associated with the passcode, which can aid in allowing multiple connections or linkings with different social networking services for the same CE device. In many instances, the CE device does not need to have knowledge of the structure or information within the credentials. Additionally as described above, some embodiments utilize a passcode or other information that can be used by the interchange service 114 to associate communications with a social networking service 116 to a particular CE device 112.

Figure 7:
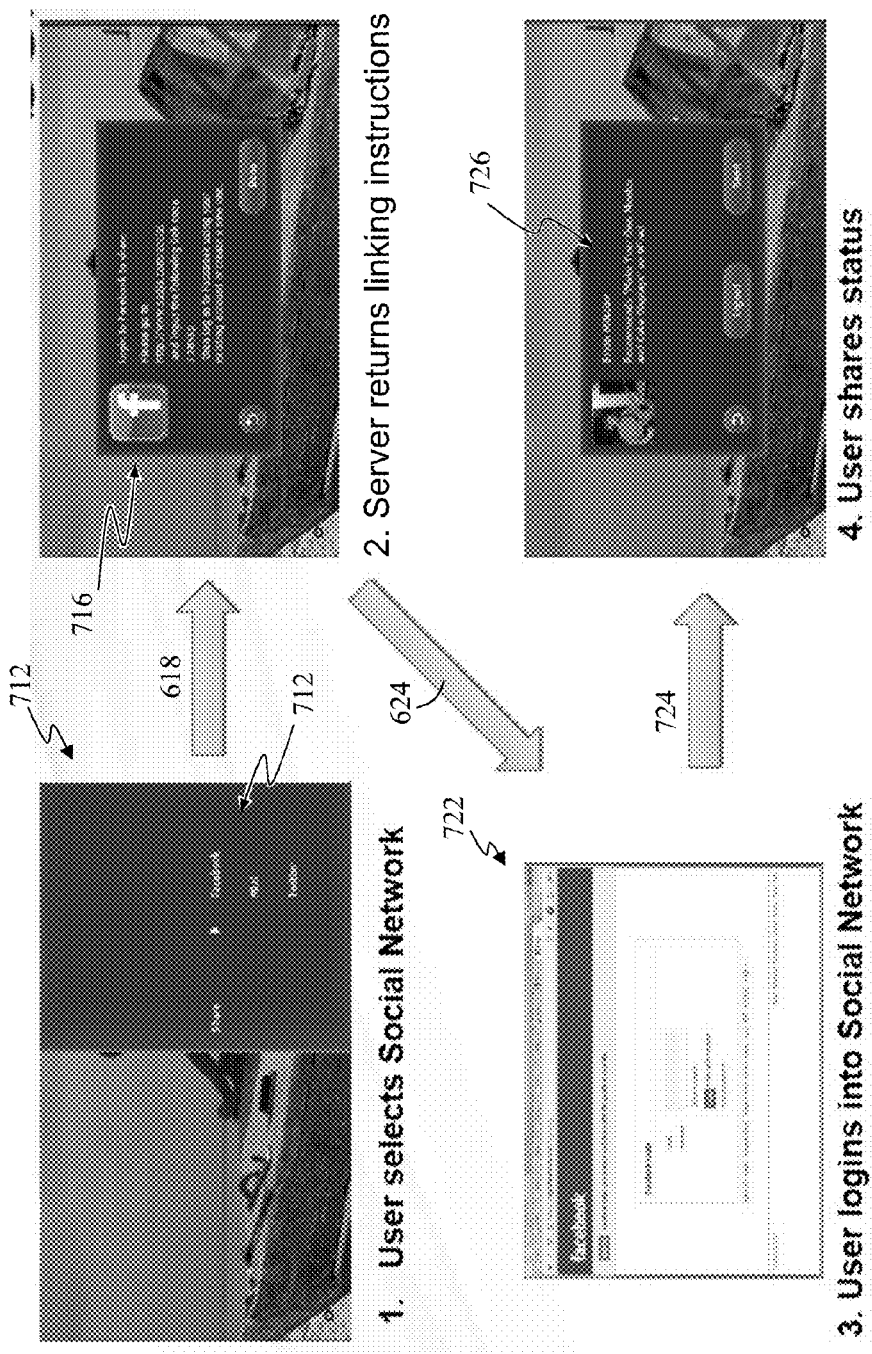
FIG. 7 illustrates exemplary screen shots of some of the steps of the process for connecting and logging in to a third party social networking service as it appears to a user on an exemplary CE device.

FIG. 7 illustrates exemplary screen shots of some of the steps of the process 610 for connecting and logging in to a third party social networking service 116 as it appears to a user 612 on an exemplary CE device 112 (e.g., an IPTV). Typically, the user 612 is shown the listing of available social networking services 712 as acquired in step 414. Again, in some embodiments, to initiate communication between the interchange service 114 and a selected social networking service 116 (e.g., Facebook™), an authentication process is performed. In many instances authentication with service providers and/or social networking clients is performed through an HTTP API interaction. For example, some embodiments utilize authentication using OAuth or other similar applications that reduce the possibility of a third party application, in this case the interchange service 114, from directly acquire a user's password. In such instances, to complete the communication linking process, the interchange service 114 incorporates the added processing (e.g., utilizing the passcode) to allow the user to login directly at the social networking service (e.g., social networking service's website).

To establish communication between the interchange service 114 and the social networking service 116 in such embodiments, the user 612 initiates login through the interchange service (step 614). In some instances, the user is directed to and visits a website 712 associated with the interchange service 114. For example, the interchange service 114 identifies the listing of supported social networking services 714. In response to initiating a login with one of the supported social networking services (e.g., selection of one of the supported social networking services) the interchange service 114, in step 618, returns the access information 716 for the social networking service to the CE device, which may include instructions and/or linking information (e.g., "Please go to: www.ssaajj.com"), and typically further identifies the linking code or passcode and may also include instructions in using the passcode (e.g., 738×kp).

The user is redirected in step 624 to the intended social networking service 116, such as to a website 722 of the intended social networking service 116 (e.g., Facebook™ website) is displayed. The user 612 follows the login procedure at the social networking service. The social networking service 116, upon receiving the login request, authenticates the user login information (e.g., user name and password) and in step 630 returns, in some embodiments, a temporary token or other credentials. At this stage in the process the linking request from the interchange service 114 is authenticated and the user 612 is returned 724 to the interchange service 114 (e.g., a website 726 is displayed associated with the interchange service 114 with the temporary token).

In some embodiments, the interchange service 114 in step 632 directly contacts the social networking service 116. Upon contacting the social networking website the interchange service 114 utilizes the temporary credentials to authenticate the interchange service and receives in step 634 one or more valid and/or actual credentials, tokens or the like. The interchange service 114 is then authenticated and in direct communication over the distributed network 120 with the social networking service 116. The user 612 can then interact with the social networking service 116 through the interchange service 114, such as being directed 724 to an option to implement one or more commands at the social networking service, such as being shown an option 726 to post a message, use a predefined phrase from the phrase list, or other such options.

Again, the interchange service 114 may store the actual token and can use the token to contact the social networking service 116, and can typically contact the social networking service without further user action. In such embodiments, the user may only have to complete the login process once for each social networking service 116-118. In some embodiments, the login process may alternatively be completed each time the user 612 changes their login information at the social networking service 116-118, which may make the previous actual token no longer valid. In other embodiments, the token may have a validity duration, and the user 612 may have to revalidate the credentials periodically to keep the token valid and/or obtain new credentials.

In some embodiments, upon establishing the communication, the social networking APIs can be based on the standard HTTP methods of communication to enable communication between the interchange service 114 and the social networking service 116. Similarly, in some embodiments, communication between the various social networking services 116-118 and account linking is performed using the HTTP protocol and/or through a Web Server. Further, with some embodiments, HTTP is used for communications with the social networking services 116-118, with an HTTP based social networking API in accessing connections users have created. Additionally, in one or more embodiments, the social networking APIs that are based on HTTP may also be used to indicate to the CE devices 112 which social networking services are available, such that supported social networking services can be dynamically adjusted.

In some instances, the login or login command 614 may be initiated by the CE device 112 and/or the interchange service 114 in response to a different instruction received from the user 612. For example, the user may request an action be initiated at a social networking service, such as posting a status update, or a command to share information, or other such action. In response to this command the CE device 112 may identify that the user is not actively logged into the social networking service, and accordingly the CE device 112, interchange service 114 and/or social networking service 116 may active the login. For example, the user 612 may initiate a share command while the CE device 112 does not have credentials or current credentials corresponding to the social networking service 116, and accordingly, the interchange service 114 may initiate a login to acquire the credentials.

Figure 8:
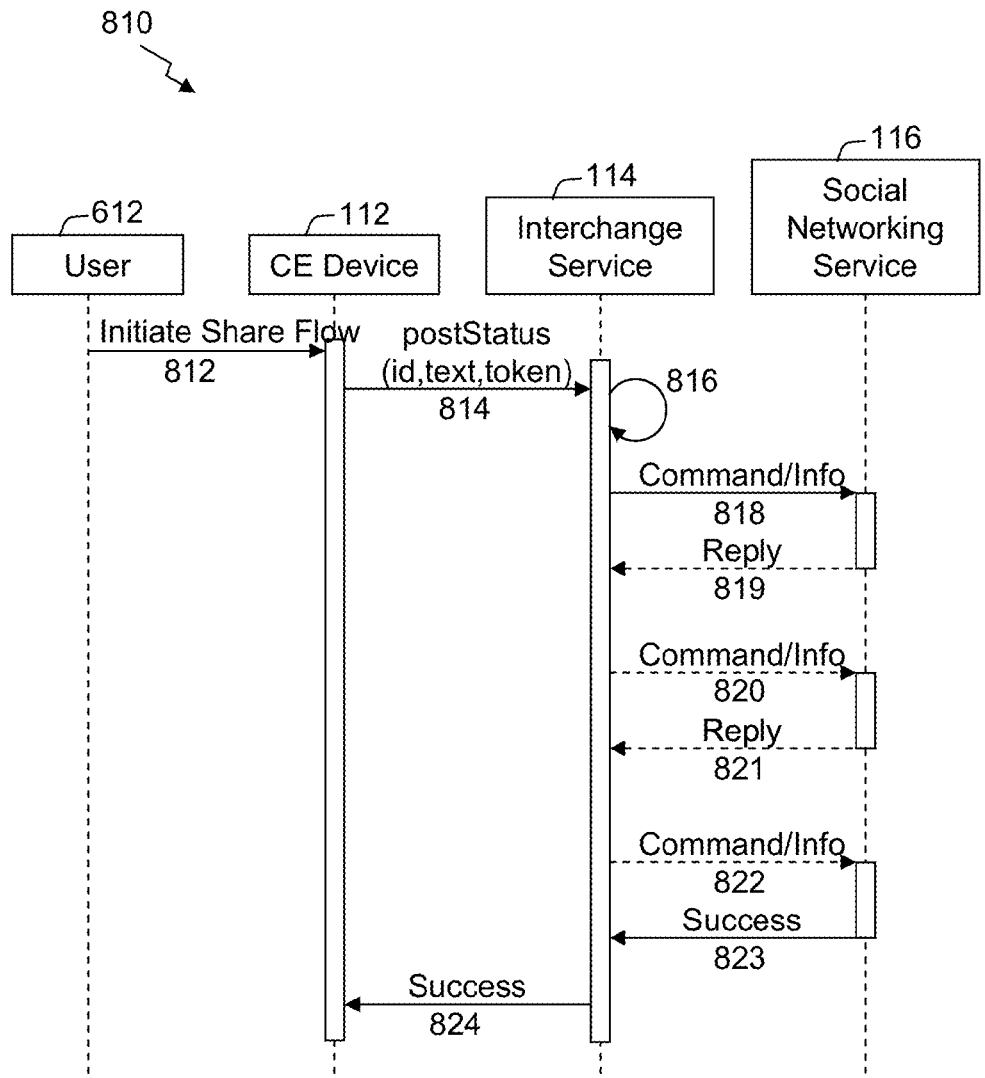
FIG. 8 depicts a simplified block diagram of a system, according to some embodiments, showing example interactions of a user with the CE device, and example communications between the CE device, the interchange service and a social networking service after login has been established.

FIG. 8 depicts a simplified block diagram of a system 810, according to some embodiments, showing example interactions of a user 612 with the CE device 112, and example communications between the CE device 112, the interchange service 114 and a social networking service 116 after login has been established. In this example, a user 612 initiates a command or request (step 812) at the CE device 112 to be forwarded to the social networking service 116. The command, for example, can be a share command to share or post information or an update at the social networking service 116. The CE device 112 configures a communication according to the intermediate API and communicates (step 814) the command to the interchange service 114. The communication identifies the CE device and/or user, and includes an identifier or identifiers of the one or more commands. Other information may additionally be included such as tokens, credentials, material to be posted (e.g., text, graphics, images, photographs, video, links, etc.), and/or other such information.

The interchange service 114 performs a translation (step 816) of the relevant portions of the communication and/or command and other information when relevant, and configures a communication according to the social networking API. The interchange service 114, in some instances, confirms the communication and/or credentials associated with the CE device 112. In some embodiments, the interchange service 114 issues error codes or notifiers, such as when credentials have expired rather than merely relying on the social networking services confirmation of credentials. The communication is forwarded (step 818) from the interchange service 114 to the social networking service 116 that in turn processes the commands and takes appropriate action, which may include confirming credentials, authorization and the like. As described above, the translation performed by the interchange service 114 may in some instances result in a set of communications (steps 818, 820, 822) and/or set of commands. Accordingly, one or more communications exchanges 818-823 may result between the interchange service 114 and the social networking service 116 in implementing a command requested through the CE device 112. Upon completion of the command issued by the user a success, confirmation, requested information or other relevant notification is returned (step 822) from the social networking service 116. The interchange service 114 in turn confirms (step 824) with the CE device 112 of the completion of the command and/or performs a translation from the social networking API to the intermediate API and returns appropriate information when relevant to the CE device 112.

The commands that can be issued by the CE device 112, to be directed by the interchange service 114 to the social networking service 116-118, can include numerous different types of commands depending on the services available at the social networking service 116-118. As described above, an example command or communication can be a post or status update command. Some embodiments utilize the predefined phrase listing such that the user can select one of the predefined phrases and the command includes an identifier of the selected predefined phrase (phrase_id). Additionally or alternatively, some commands may allow freeform text data, graphics, images, pictures, video and the like to be forwarded to the social networking service. Often the command communication identifies the CE device 112 and/or user, as well as the intended social networking service and the command, which may be a predefined command (e.g., status update, post, etc.). Additional information may be included with the command such as a phrase identifier, freeform text or other information. Further, the commands typically also include credentials, tokens and/or other authorization and/or identification information. Other information may be included, such as some or all of the information identified above (e.g., address information, model name, versions, language, and the like), provider information (which may depend on the source of content, such as BIVL content, disc format information, network identifiers, etc.), asset identification, asset type (e.g., video, audio, etc.), content title, playback time, artist identifier, album identifier, series identifier, request to preview the posting before being posted, and/or other such information. Other commands may request feedback from other users, such as a request for feedback based on a status posting, where the command may include similar information as above.

The interchange service 114 provides an interface between the intermediate API and the social networking API. In some instances, the interchange service 114 provides in part a proxy layer and/or translation proxy receiving communications, requests and/or commands intended for a social networking service 116 and translates those into communications and/or commands to be configured according the social networking API and/or native language utilized by the intended social networking service 116. Further, because the interchange service 114 provides an intermediary between the APIs, when a change in the social networking API occurs, similar changes do not necessarily have to be made for each different kind and/or model of CE device or have to be pushed out to large numbers of CE devices, which can be time consuming, costly and complicated. Similarly, the interchange service 114 provides the intelligence so that a service, CE device distributor and/or manufacturer can simplify the CE devices, and simplify the communication with CE devices by utilizing the single intermediate API. Further, the utilization of the intermediate API maintain legacy CE devices and allows for the continued use of these legacy CE devices. Furthermore, the interchange service 114 can implement a set of two or more requests, commands and/or information exchanges with a social networking service 116 as part of the translation of the request or command from the CE device, and often can implement these sets of exchanges without further user interaction or CE device interaction. In some instances, further communication may be implemented by the interchange service 114 to acquire additional information from a CE device 112 and/or user 612 to complete one or more command sets. As described above, some embodiments utilize authentications, credentials, tokens, encryption and/or other methods of providing security to communications and/or access to the social networking service 116-118.

The social networking APIs in cooperation with the interchange service 114 and the intermediate API provide a method for a CE device 112 (e.g., an IPTV client) to access and share data via a common mechanism. The intermediate API can comprise and/or utilize a request protocol used by the CE devices 112, which in some embodiments is HTTP and/or HTTPS based and may additionally be through an SSL connection. In some instances, the replies and/or results from the interchange service 114 to the CE devices 112 can be XML formatted, JSON formatted or similarly formatted. Further, the interchange service 114 can be implemented as a well-known, persistent resource (WKR), which can be a composite comprised of multiple components (e.g., hostname pool; domain; URI; etc.). In some embodiments, calls within the intermediate API support client side caching of some of the communication, such as meta-data. Header information, such as standard HTTP headers, can further be used to indicate with some information and/or communications a lifetime of the content. For example, communications having a list of data support caching, while other calls may not be cached unless otherwise specified. Parameters may define a lifetime or expiration time of data in the communication. Similarly, a last modified parameter may indicate a date and time at which the communicating device believes a variant was last modified, which if supported can be used to determine whether the full request is to be made or if the previously cached value is current. Further, in some embodiments the interchange service 114 may utilize predefined status codes defining conditions, such as conditions relative to communications and/or actions taken (e.g., failures, limits, availability, invalid information and the like).

In some embodiments, the CE device 112 communicates a request for confirmation and/or social networking service configuration information as a confirmation that the interchange service 114 is functioning and providing access to the social networking services. The interchange service 114 can return a confirmation, which may include configuration information for the available social networking features. With the knowledge of the available features the CE device 112 can issue subsequent communications and/or calls relevant to the features available. In some instances, an empty list or null data for the configuration information is returned to indicate that social networking features are disabled, typically temporarily disabled. The CE device may similarly disable social networking features until a non-empty list is returned.

In acquiring the credentials the login typically is completed before credentials are forwarded. As described above, in some implementations with some social networking services a direct login is performed by the user, where login parameters and/or credentials may be supplied as POST data. Some embodiments use a web based login procedure that implements a polling process where a user indicates that the linking process has been completed the CE device 112 can begin polling based on a schedule, periodically or the like (e.g., every 3 seconds for a maximum of 30 seconds to determine whether credentials are available); and when the linking process is still incomplete after a threshold period the CE device can prompt the user before restarting the polling process. Further, CE devices 112 with browser functionality may periodically check the active URL to determine when the user has been returned to the linking URL and then begin the same polling process.

The data from this response can be stored on the CE device 112 and/or the interchange service 114 for future use. By maintaining this information on the CE device, the user interface and implementation features can be independent of the intermediate API. Multiple accounts for a single social network may also be maintained by a CE device when desired. In some implementations, the CE device 112 clears the stored data when logged out from the social networking service, while continuing to stored data at the CE device, as a consumer would expect. Further, in some implementations a method is provided to remove one or more accounts. Additionally, a power off, reboot, software update, and/or other non-destructive actions typically does not clear the stored data. A service or user initiated factory reset or a restore of defaults may also be provided that allows the CE device to clear the stored data, for example, for privacy reasons. Similarly, when credentials expire a notification can be returned (e.g., during a status method call), and in some instances the credentials can be removed.

Referring back to FIG. 1, the system 110 typically includes a plurality of CE devices 112 configured to communicate with the interchange service 114 utilizing the intermediate API over the distributed network 120. Further, the interchange service 114 communicates over the distributed network with the one or more social networking services 116-118, where the communications are typically configured according to a social networking API corresponding to the intended social networking service 116-118. The CE devices 112 can be substantially any consumer electronic device configured to access the interchange service 114 and interact with the one or more social networking services 116-118 through the interchange service. For example, a CE device 112 can be an Internet Protocol (IP) enabled television, an IP enabled Bluray player, an electronic gaming device, an audio player, computer, laptop, a tablet device, and/or other such consumer electronic devices.

The interchange service 114 is remote from the CE devices 112, and typically remote from the social networking services 116-118. The interchange service 114 can be implemented through one or more servers, computers and/or other devices that are distributed over the network 120, which can operate independently or cooperatively. For example, the interchange service 114 may be a collection of servers distributed over the network 120, where the servers can be implemented through substantially any server, device or collection of devices configured to communicate over the distributed network 120 and provide the translation between the intermediate API and the one or more social networking APIs. For example, one or more of the servers implementing the interchange service 114 can be servers operating under the BIVL™ service provided by Sony Corporation.

The social networking services 116-118 are configured to provide users with access to social networking interaction with other users distributed over the network. The social networking services 116-118 are not limited to interactions and/or communications with the interchange service 114 and/or the CE devices 112 accessing the services through the interchange service, but instead can be accessed over the distributed network by different CE devices, such as personal computers, tablet devices, smart phones and the like. The social networking services 116-118 allow users to interact with other users by posting information about themselves and/or others, posting pictures or video, adding links to things of interest, and other such information, as well as allowing users to access this information. Additionally, some social networking services provide users with the ability to communicate through the social networking service. Examples of social networking services include Facebook™, MySpace™, Twitter™, LinkedIn™, Mixi™, and other such social networking services.

In some implementations, the CE devices 112 can be manufactured with information to access the interchange service 114. For example, the service providing the interchange service 114 can comprise servers operating under the BIVL service, and the CE devices 112 may be pre-programmed with a link, URL or other information to access the BIVL service or other service. The network 120 can be the Internet, a WAN, a LAN or other such networks or combinations of such networks that are configured to allow communication between devices.

Figure 9:
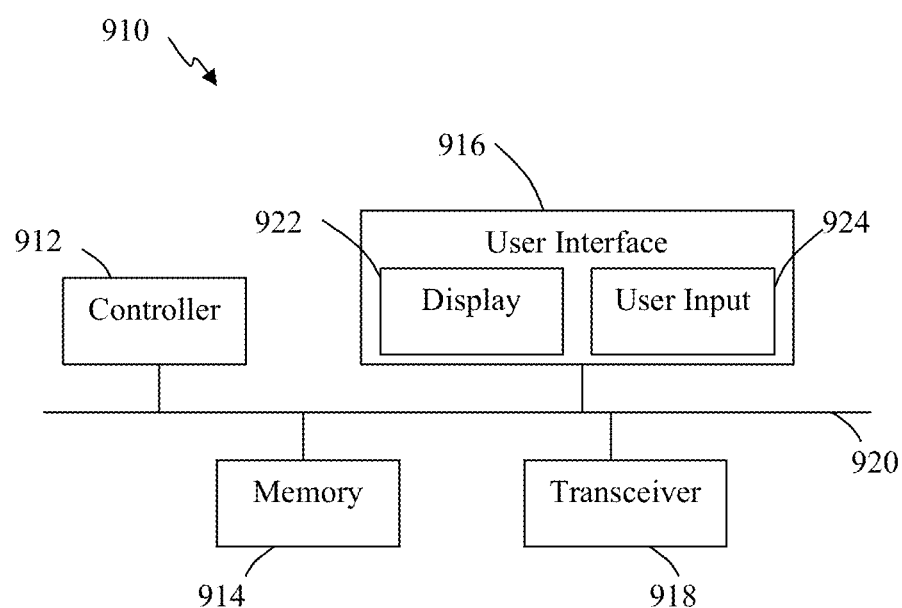
FIG. 9 illustrates a system for use in implementing methods, techniques, devices, apparatuses, systems, servers, sources and the like in establishing interfaces or interchanges between consumer electronic (CE) devices and networking services in accordance with some embodiments.

The methods, techniques, devices, services, servers, sources, systems and the like described herein may be utilized, implemented and/or run on many different types of devices and/or systems. Referring to FIG. 9, there is illustrated a system 910 that may be used for any such implementations, in accordance with some embodiments. One or more components of the system 910 may be used for implementing any system, apparatus or device mentioned above or below, such as for example any of the above or below mentioned CE devices 112, one or more interchange servers implementing the interchange service 114, social networking servers used by the social networking services 116-118, and the like. However, the use of the system 910 or any portion thereof is certainly not required.

By way of example, the system 910 may comprise a controller or processor module 912, memory 914, a user interface 916, and one or more communication links, paths, buses or the like 920. A power source or supply (not shown) is included or coupled with the system. The controller 912 can be implemented through one or more processors, microprocessors, central processing unit, logic, local digital storage, firmware and/or other control hardware and/or software, and may be used to execute or assist in executing the steps of the methods and techniques described herein, and control various communications, programs, content, listings, services, interfaces, etc. The user interface 916 can allow an administrator, customer or user to interact with the system 910 and receive information through the system. In some instances, the user interface 916 includes a display 922 and/or one or more user inputs 924, such as a remote control, keyboard, mouse, track ball, game controller, buttons, touch screen, remote control, etc., which can be part of or wired or wirelessly coupled with the system 910.

Typically, the system 910 further includes one or more communication interfaces, ports, transceivers 918 and the like allowing the system 910 to communication over the distributed network 120, other networks or communication channels with other devices and/or other such communications. Further the one or more transceivers 918 can be configured for wired, wireless, optical, fiber optical cable or other such communication configurations or combinations of such communications.

The system 910 comprises an example of a control and/or processor-based system with the controller 912. Again, the controller 912 can be implemented through one or more processors, controllers, central processing units, logic, software and the like. Further, in some implementations the controller 912 may provide multiprocessor functionality.

The memory 914, which can be accessed by the controller 912, typically includes one or more processor readable and/or computer readable media accessed by at least the controller 912, and can include volatile and/or nonvolatile media, such as RAM, ROM, EEPROM, flash memory and/or other memory technology. Further, the memory 914 is shown as internal to the system 910; however, the memory 914 can be internal, external or a combination of internal and external memory, as well as internal and/or external to the controller 912. The external memory can be substantially any relevant memory such as, but not limited to, one or more of flash memory secure digital (SD) card, universal serial bus (USB) stick or drive, other memory cards, hard drive and other such memory or combinations of such memory. The memory 914 can store code, software, executables, scripts, data, content, libraries, lookup tables, passcodes, links, login information, multimedia content, programming, programs, media stream, media files, textual content, identifiers, log or history data, user information and the like. In some embodiments, the memory 914 stores software that is used in configuring the communications according to the intermediate API or one of the social networking APIs.

One or more of the embodiments, methods, processes, approaches, and/or techniques described above or below may be implemented in one or more computer programs executable by a processor-based system. By way of example, such a processor based system may comprise the processor based system 910, a computer, IP enabled television, IP enabled Blu-ray player, entertainment system, game console, graphics workstation, tablet, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for allowing a CE device 112 to interact with one or more social networking services 116-118 through the interchange service 114. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium for embodying a computer program for input to a processor or computer and a computer program embodied in the medium for causing the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs adapted to cause a computer and/or processor based system to execute steps comprising: establishing an intermediate application programming interface (API) between a plurality of remote consumer electronic (CE) devices and one or more social networking APIs, where each of the one or more social networking APIs correspond to a social networking service; translating, through an interchange service, communications between the intermediate API and the one or more social networking APIs; identifying modifications to a first social networking API of the one or more social networking APIs; implementing a first update to the interchange service such that translations provided by the updated interchange service between the intermediate API and the first social networking API are consistent with the modifications to the first social networking API; and avoiding updating at each of the plurality of CE devices relative to the modifications to the first social networking API while still allowing each of the plurality of CE devices to access and communicate according to the modified first social networking API through the translation between the intermediate API and the modified first social networking API.

Some embodiments additionally provide computer program products configured to cause the processor based system to perform steps comprising: identifying each of the one or more social networking services with which the interchange service is configured to provide the translation between the intermediate API and the one or more social networking APIs; generating a listing of the identified one or more social networking services; and communicating the listing to a first CE device of the plurality of CE devices notifying a user at the first CE device of each of the identified one or more social networking services with which the interchange service is configured to provide the translations. Additionally or alternatively, some embodiments provide computer program products configured to cause the processor based system to perform steps comprising: receiving, at the interchange service, a communication implemented according to the intermediate API from a first CE device of the plurality of CE devices, where the communication comprises a command defining a function to be performed at a first social networking service of the one or more social networking services; identifying, corresponding to the communication, the first social networking service; identifying a social networking API of the one or more social networking APIs corresponding to the first social networking service; generating at the interchange service a command set consistent with the social networking API, where the command set comprises one or more commands executable at the first social networking service to cause the first social networking service to perform the function; and communicating the command set to the first social networking service over a distributed network. Still further, some embodiments provide computer program products wherein the generating the command set comprises: identifying a library corresponding to the social networking API; identifying within the library a first entry corresponding to the command communicated by the first CE device; and identifying within the library one or more additional entries associated with the first entry and comprising the command set corresponding to the social networking API. Further embodiments in communicating the command set comprises: communicating a first command of the command set; receiving a reply in response to the first command; identifying, without communicating with the first CE device, a second command of the command set based on the received reply; and communicating the second command in response to the reply.

In some embodiments, the interchange service 114 receives communications from CE devices 112 configured according to the intermediate API. From the communication or based on prior communications from the CE device the interchange service can identify an intended recipient social networking service 116-118. The interchange service 114 can extract relevant communication information, such as commands or requests, intended for the social networking service and translate the relevant communication information to conform with the social networking API corresponding to the intended social networking service 116. Some embodiment utilize one or more libraries and/or look-up tables maintained at the interchange service or a remote service or database accessible by the interchange service (e.g., accessible over the Internet).

Other embodiments provide methods of communication between CE devices and services accessible over a distributed network. Some of these methods comprise: establishing, over the distributed network, an intermediate API with a plurality of remote CE devices, where the intermediate API is configured to allow the plurality of CE devices to interact with one or more social networking service each associated with and utilizing a corresponding social networking API; identifying, at an interchange service, a new social networking API in addition to the one or more social networking APIs; updating the interchange service to provide a translation between the intermediate API and new social networking API; and avoiding updating at each of the plurality of CE devices while still allowing each of the plurality of CE devices to access and interact with the new social networking service. Some embodiments further identify modifications to a first social networking API of the one or more social networking APIs; update the interchange service such that the interchange service provides a translation between the intermediate API to the first social networking API consistent with the modifications to the first social networking API; and avoiding updating at each of the plurality of CE devices while still allowing each of the plurality of CE devices to access and communicate according to the modified first social networking API. Accordingly, some embodiments incorporate an intermediate API between the CE devices and the various other APIs that allows the interchange service implementing the intermediate API to take on the burden of being updated in accordance with modified APIs and/or additions of APIs while the CE devices continue to maintain and used the single intermediate API.

Other embodiments provide methods and systems of providing communications with network services. Some of these methods establish an intermediate API between a plurality of remote CE devices and the one or more social networking APIs; translate commands configured according to the intermediate API from a CE device to one or more corresponding commands configured according to a social networking API; identify a modification to one of the social networking APIs; update the translations between the intermediate API and the modified social networking API such that communications configured according to the intermediate API are translated and configured according to and consistent with the modified social networking API; and preventing updating at each of the plurality of CE devices while still allowing each of the plurality of CE devices to access and communicate with a social networking service utilizing the modified social networking API.

Similarly, some embodiments provide methods that establish an intermediate API between a plurality of remote CE devices and the one or more social networking APIs; translate commands configured according to the intermediate API from a CE device to one or more corresponding commands configured according to a social networking API; identify a new social networking API in addition to the one or more social networking APIs; adding translations between the intermediate API and the new social networking API such that communications configured according to the intermediate API are translated and configured according to and consistent with the new social networking API; and preventing updating at each of the plurality of CE devices while still allowing each of the plurality of CE devices to access and communicate with the new social networking API.

Further embodiments provide methods and system of accessing network services. Some of these methods, comprise: providing, through an interchange service, an API language translation between a first API language and a second API language, where communications over the Internet between the interchange service and a remote CE device are configured according to the first API language, and communications over the Internet between the interchange service and a remote social networking service are configured according to the second API language; and modifying the interchange service in response to modifications to the second API language such that subsequent communications to the social networking service are configured according to the modified second API language such that modifications are avoided at the CE device while still allowing the CE device to accurately interact with the social networking service. Additionally, in some implementations, the modifying the interchange service comprises: updating, at the interchange service, a first command set to compensate for modifications in functionality at the social networking service; and associating the first command set with one or more commands configured according to the first API language, such that when the one or more commands are received over the Internet from the CE device the interchange service identifies and communicates one or more commands of the first command set in place of the one or more commands received from the CE device.

In some embodiment, methods and systems of maintaining communications with network services are provided. Some of these methods comprise: providing, through an interchange server, a translation of a first set of communications from a first API language to a second API language producing a translated first set of communications, and providing a translation of a second set of communications from the second API language to the first API language producing a translated second set of communications; updating the interchange server to compensate for changes in the second API language corresponding to changes at an associated network service such that the CE device does not have to be updated; and continuing to allow the CE device to direct communications to the network service in accordance with the changes implemented at the network service.

Other embodiments provide methods and systems that translate a first set of communications, received over the Internet at an interchange service and from a remote CE device, from a first API language to a second API language, where the first API language is used with communications between the interchange service and the remote CE device; and communicate the translated first set of communications over the Internet to a remote network service corresponding to and utilizing the second API language. Similarly, some methods and systems according to some embodiments translate a communications, received over the Internet at an interchange service and from the network service, from the second API language to the first API language, where the second API language is used with communications between the interchange service and the networking service; and communicate the translated communications over the Internet to a CE device utilizing the first API language.

In some embodiments, methods and systems are provided that enable access to network services by receiving at an interchange service, from over the Internet and from a remote consumer electronic (CE) device, a request to access a social networking service accessible over the Internet, wherein the request is configured according to a first API implemented between the CE device and the interchange service; identifying, at the interchange service and from the request, the network service; identifying, at the interchange service and from the request, a command requested to be implemented at the network service, where the command is defined according to the first API; identifying, at the interchange service, a network service command corresponding to the command and defined according to a second API implemented between the interchange service and the network service; and communicating the network service command configured according to the second API.

Still other embodiments provide methods of interacting with network services, comprising establishing a connection with a third party social networking client with respect to a CE device; receiving a command from the CE device implemented in a device specific protocol intended to cause a function to be performed at the third party social networking client; generating, based on the command received from the CE device, a command set comprising one or more commands configured to be executed at the social network client for performing the function; sending the command set configured according to a social networking API that is different than the device specific protocol to the third party social networking client over the connection; implementing modifications in accordance with modifications to the social networking API such at a subsequent command set, generated in response to received a subsequent command from the CE device and implemented in the device specific protocol, is configured according to the modified social networking API when communicated to the third party social networking client.

While the invention herein disclosed has been described by means of specific embodiments, examples and applications thereof, numerous modifications and variations could be made thereto by those skilled in the art without departing from the scope of the invention set forth in the claims.

What is claimed is:

1. A method, comprising:
establishing an intermediate application programming interface (API) between a plurality of remote consumer electronic (CE) devices and a plurality of social networking APIs, wherein each of the plurality of social networking APIs correspond to one of a plurality of social networking services;
translating, through an interchange service, communications between the intermediate API and the plurality of social networking APIs;
identifying modifications to a first social networking API of the plurality of social networking APIs;
implementing a first update to the interchange service such that translations provided by the updated interchange service between the intermediate API and the first social networking API are consistent with the modifications to the first social networking API;
avoiding updating at each of the plurality of CE devices relative to the modifications to the first social networking API while still allowing each of the plurality of CE devices to access and communicate according to the modified first social networking API through the translation between the intermediate API and the modified first social networking API;
identifying each of the plurality of social networking services with which the interchange service is configured to provide the translation between the intermediate API and the plurality of social networking APIs;
generating a listing of the identified the plurality of social networking services; and communicating the listing to a first CE device of the plurality of CE devices notifying a user at the first CE device of each of the identified plurality of social networking services with which the interchange service is configured to provide the translations.

2. The method of claim 1, further comprising:
detecting that a second social networking service is no longer available;
dynamically modifying the listing to remove the second social networking service; and
communicating the modified listing to the first CE device.

3. The method of claim 1, further comprising:
identifying an additional social networking API in addition to the plurality of social networking APIs, wherein the additional social networking API corresponds to an additional social networking service;
implementing a second update to the interchange service such that the interchange service provides translations between the intermediate API and the additional social networking API; and
avoiding updating at each of the plurality of CE devices to support the additional social networking API while still allowing each of the plurality of CE devices to access and communicate according to the additional social networking API through the translation between the intermediate API and the additional social networking API.

4. The method of claim 3, further comprising:
dynamically modifying a listing of the plurality of social networking services with which the interchange service is configured to provide the translation to add the additional social networking service; and
communicating the listing to each of the plurality of CE devices notifying each of the plurality of CE devices of the availability of the additional social networking service.

5. The method of claim 1, further comprising:
receiving, at the interchange service, a communication implemented according to the intermediate API from a first CE device of the plurality of CE devices, where the communication comprises a command defining a function to be performed at a first social networking service of the plurality of social networking services;
identifying from the communication the first social networking service;
identifying a social networking API of the plurality of social networking APIs corresponding to the first social networking service;
generating at the interchange service a command set consistent with the social networking API, where the command set comprises one or more commands executable at the first social networking service to cause the first social networking service to perform the function; and
communicating the command set to the first social networking service over a distributed network.

6. The method of claim 5, wherein the generating the command set comprising:
identifying a library corresponding to the social networking API;
identifying within the library a first entry corresponding to the command communicated by the first CE device; and
identifying within the library one or more additional entries associated with the first entry and comprising the command set corresponding to the social networking API.

7. The method of claim 5, wherein the communicating the command set comprises:
communicating a first command of the command set;

receiving a reply in response to the first command;
identifying, without communicating with the first CE device, a second command of the command set based on the received reply; and
communicating the second command in response to the reply.

8. The method of claim 1, further comprising:
associating a passcode with a first CE device of the plurality of CE devices;
redirecting, from the interchange service, a request to login to a first social networking service to access a login functionality at the first social networking service;
receiving, directly at the interchange service and not through the first CE device, in response to completing the login credentials from the first social networking service, where the credentials are associated with the passcode and the first CE device.

9. The method of claim 1, further comprising:
receiving, at the interchange service, scheduling defining timing when to implement the modifications to the first social networking API;
wherein the implementing the first update to the interchange service comprises implementing the first update to the interchange service in accordance with the timing defined within the scheduling.

10. A computer program product comprising a non-transitory computer readable medium for embodying a computer program for input to a processor based system and a computer program embodied in the non-transitory computer readable medium for causing the processor based system to perform steps comprising:
establishing an intermediate application programming interface (API) between a plurality of remote consumer electronic (CE) devices and plurality of social networking APIs, wherein each of the plurality of social networking APIs correspond to one of a plurality of social networking services;
translating, through an interchange service, communications between the intermediate API and the plurality of social networking APIs;
identifying modifications to a first social networking API of the plurality of social networking APIs;
implementing a first update to the interchange service such that translations provided by the updated interchange service between the intermediate API and the first social networking API are consistent with the modifications to the first social networking API;
avoiding updating at each of the plurality of CE devices relative to the modifications to the first social networking API while still allowing each of the plurality of CE devices to access and communicate according to the modified first social networking API through the translation between the intermediate API and the modified first social networking API;
identifying each of the plurality of social networking services with which the interchange service is configured to provide the translation between the intermediate API and the plurality of social networking APIs;
generating a listing of the identified plurality of social networking services; and
communicating the listing to a first CE device of the plurality of CE devices notifying a user at the first CE device of each of the identified plurality of social networking services with which the interchange service is configured to provide the translations.

11. A computer program product in accordance with claim 10 further configured to cause the processor based system to perform steps comprising:
receiving, at the interchange service, a communication implemented according to the intermediate API from a first CE device of the plurality of CE devices, wherein the communication comprises a command defining a function to be performed at a first social networking service of the plurality of social networking services;
identifying, corresponding to the communication, the first social networking service;
identifying a social networking API of the plurality of social networking APIs corresponding to the first social networking service;
generating at the interchange service a command set consistent with the social networking API, where the command set comprises one or more commands executable at the first social networking service to cause the first social networking service to perform the function; and
communicating the command set to the first social networking service over a distributed network.

12. A computer program product in accordance with claim 11 wherein the generating the command set comprises:
identifying a library corresponding to the social networking API;
identifying within the library a first entry corresponding to the command communicated by the first CE device; and
identifying within the library one or more additional entries associated with the first entry and comprising the command set corresponding to the social networking API.

13. A computer program product in accordance with claim 11 wherein the communicating the command set comprises:
communicating a first command of the command set;
receiving a reply in response to the first command;
identifying, without communicating with the first CE device, a second command of the command set based on the received reply; and
communicating the second command in response to the reply.

14. A system for use in providing access to network services, the system comprising:
means for establishing an intermediate application programming interface (API) between a plurality of remote consumer electronic (CE) devices and plurality of social networking APIs, wherein each of the plurality of social networking APIs correspond to one of a plurality of social networking services;
means for translating, through an interchange service, communications between the intermediate API and the plurality of social networking APIs;
means for identifying modifications to a first social networking API of the plurality of social networking APIs;
means for implementing a first update to the interchange service such that translations provided by the updated interchange service between the intermediate API and the first social networking API are consistent with the modifications to the first social networking API and avoiding updating at each of the plurality of CE devices relative to the modifications to the first social networking API while still allowing each of the plurality of CE devices to access and communicate according to the modified first social networking API through the translation between the intermediate API and the modified first social networking API;
means for identifying each of the plurality of social networking services with which the interchange service is configured to provide the translation between the intermediate API and the plurality of social networking APIs;

means for generating a listing of the identified plurality of social networking services; and means for communicating the listing to a first CE device of the plurality of CE devices notifying a user at the first CE device of each of the identified plurality of social networking services with which the interchange service is configured to provide the translations.

15. The system of claim 14, further comprising:

means for identifying an additional social networking API in addition to the plurality of social networking APIs, wherein the additional social networking API corresponds to an additional social networking service; and means for implementing a second update to the interchange service such that the interchange service provides translations between the intermediate API and the additional social networking API, and avoiding updating at each of the plurality of CE devices to support the additional social networking API while still allowing each of the plurality of CE devices to access and communicate according to the additional social networking API through the translation between the intermediate API and the additional social networking API.

16. The system of claim 14, further comprising:

means for receiving, at the interchange service, a communication implemented according to the intermediate API from a first CE device of the plurality of CE devices, where the communication comprises a command defining a function to be performed at a first social networking service of the plurality of social networking services;

means for identifying the first social networking service;

means for identifying a social networking API of the plurality of social networking APIs corresponding to the first social networking service;

means for generating at the interchange service a command set consistent with the social networking API, where the command set comprises one or more commands executable at the first social networking service to cause the first social networking service to perform the function; and means for communicating the command set to the first social networking service over a distributed network.

17. The system of claim 16, wherein the means for communicating the command set comprises:

means for communicating a first command of the command set;

means for receiving a reply in response to the first command;

means for identifying, without communicating with the first CE device, a second command of the command set based on the received reply; and means for communicating the second command in response to the reply.

18. The system of claim 16, wherein the means for generating the command set comprises:

means for identifying a library corresponding to the social networking API;

means for identifying within the library a first entry corresponding to the command communicated by the first CE device; and means for identifying within the library one or more additional entries associated with the first entry and comprising the command set corresponding to the social networking API.

* * * * *

UNITED STATES PATENT AND TRADEMARK OFFICE
CERTIFICATE OF CORRECTION

PATENT NO. : 8,909,705 B2  
APPLICATION NO. : 13/183238  
DATED : December 9, 2014  
INVENTOR(S) : Douillet et al.

Page 1 of 1

It is certified that error appears in the above-identified patent and that said Letters Patent is hereby corrected as shown below:

In the CLAIMS:
Claim 1, column 23, line 66, after "identified" delete "the".

Signed and Sealed this  
Ninth Day of June, 2015

Michelle K. Lee  
*Director of the United States Patent and Trademark Office*